United States Patent Office 3,108,047
Patented Oct. 22, 1963

3,108,047
STATOLON PRODUCTION BY SUBMERGED
CULTURE FERMENTATION
William M. Stark, Walter J. Kleinschmidt, and Gerald W. Probst, Indianapolis, Ind., assignors to Eli Lilly and Company, Indianapolis, Ind., a corporation of Indiana
No Drawing. Filed Feb. 12, 1962, Ser. No. 172,770
11 Claims. (Cl. 195—36)

The present invention relates to antiviral compositions. More particularly, it relates to antiviral substances of the type elaborated by the organism *Penicillium stoloniferum*.

It is known that *Penicillium stoloniferum* produces a substance having antiviral activity when grown upon a complex medium in flasks on a rotary shaker (Powell and Culbertson, Anitibiotics Annual, 1953–54, New York: Medical Encyclopedia, Inc., 1954, 147; Hull and Lavelle, Ann. New York Acad. Sci., 58 (1954), 1188). The fermentation broth thus obtained prophylactically inhibits a number of viruses both in animals and in tissue culture. The active principle, hereinafter referred to as "statolon," has proved to be exceedingly refractory to isolation and purification, but highly active concentrates of no significant toxicity have been obtained by using purification procedures that are applicable to large molecules. The active material is heat labile and nondialyzable. It is sedimentable by high-speed centrifugation. It is refractory to a wide variety of enzymes, but is inactivated by periodate oxidation. Nucleic acids and proteins have been extracted in large measure from the impure material without loss of activity. The active constituent of the purified product appears to be a macromolecule, a polyanionic polysaccharide composed of galacturonic acid, galactose, galactosamine, glucose, arabinose, xylose, and rhamnose.

The preparation of statolon has heretofore been carried out by flask fermentation on a rotary shaker, and the organisms heretofore available have not been adaptable to submerged-culture fermentation in tanks. This has constituted a serious obstacle to the production of statolon on a commercial scale.

An object of the present invention is to improve the preparation of statolon.

Another object is to prepare statolon by submerged-culture fermentation in tanks.

A further object is to improve the recovery and purification of statolon.

Other objects of the invention and its advantages over the prior art will be apparent from the following description and claims.

It has now been discovered that the preparation of statolon can be successfully carried out in fermentation tanks of commercial size by employing for the fermentation a new and heretofore unknown strain of the statolon-producing organism, *Penicillium stoloniferum* var. ATCC 14586.

It has also been discovered that statolon can be obtained as a concentrate of greatly improved activity and purity by precipitating the statolon values under mildly acid conditions in the presence of an organic antisolvent therefor and preferably in the presence of an inert, water-insoluble, finely divided solid, redissolving the precipitated material in a mild aqueous alkaline solution, and optionally washing the resulting solution with an immiscible lower-aliphatic alcohol and/or phenol to remove toxic factors and inactive materials.

The organism employed in the present invention is a member of the *Penicillium brevicompactum* series, which is particularly characterized by a short and compact penicillus with closely appressed elements, and by marginal stolons. It is similar to *P. brevicompactum* NRRL 2001 in morphology and size of the conidiophore, but is considered to be a strain of *P. stoloniferum* NRRL 859 owing to its closer similarity to the latter in morphology and size of metulae, sterigimata, and conidia.

The organism has been characterized, employing culture media and methods as described by Raper and Thom, A Manual of Penicillia, The Williams and Wilkins Company, 1949. Petri plate cultures on Czapek's agar, Czapek's plus corn steep agar, and malt extract agar were incubated at 26° C. for 14 to 18 days with periodic observation of stolon production, colony characteristics, morphology, color, and other distinguishing features. The following observations were made, the color names and numerals in parentheses referring respectively to color blocks and color pates in Ridgway, R., Color Standards and Color Nomenclature, 1912.

The colonies on Czapek's agar grow in a very restricted manner, reaching a diameter of only 2.9 cm. in 14 days. Heavily sporulating colonies are velutinose, somewhat raised in the center and depressed near the margin; radial furrows slight or absent; colonies gnaphalium green (XLVII) to slate olive (XLVII), reverse pale gray-green with white margin. Marginal stolons are produced in young colonies, especially after three days of incubation; in older cultures, stolons are only occasionally observed. Stolons are flexuous and often branched. Neither a characteristic odor nor a soluble pigment is detected; an abundant, clear, colorless exudate is produced. Penicilli are produced on erect conidiophores principally from the substratum. The conidiophores range from 300 to $500\mu$ in length by 3.5 to $6.3\mu$ in diameter, but are usually $400\mu$ x $5.6\mu$, thick-walled, finely echinulate, with the terminal portion somewhat swollen. The penicilli are typically compact with components appressed, bearing divergent, tangled conidial chains. One or two branches commonly occur, which are usually $3.8\mu$ x $15\mu$ in size. Metulae are typically in groups of four or five, $2.8–4.2\mu$ x $4.2–17\mu$, usually about $3.5\mu$ x $11\mu$. Sterigimata occur in groups of four to seven and are around $2.8–5.6\mu$ x $3.5–6.3\mu$, usually about $2.8–3.5\mu$ x $5.6–6.3.\mu$ The conidia are light green, usually globose to subglobose, occasionally elliptical; 2.8 to $4.9\mu$, commonly about $3.5\mu$.

Colonies on malt extract agar also exhibit restricted growth, reaching a diameter only only 2.7 cm. in 14 days. They are principally velutinose, slightly floccose during the first few days of growth. They are radially furrowed, especially near the margin; heavily sporulating, margin white, colony andover green (XLVII) to slate olive (XLVII); reverse pale gray-green with white margin as on Czapek's agar. No soluble pigment is produced, nor is a characteristic odor or exudate observed.

Colonies on Czapek's plus corn steep agar show moderate growth, reaching a diameter of 4.6 cm. in 14 days. The colonies are velutinose with moderate radial furrows; heavily sporulating, drab (XLVI) to slate olive (XLVII); reverse pale gray-green with white margin as on Czapek's agar. Exudate is abundant, clear, and colorless. Neither soluble pigment nor a characteristic odor is produced.

The production of statolon according to the present invention is carried out by inoculating a suitable fermentation medium containing a carbohydrate, a nitrogen source, and mineral salts with the statolon-producing organism, *Penicillium stoloniferum* var. ATCC 14586 and incubating with vigorous agitation and aeration at growth temperature between about 20 and about 35° C., preferably around 26° C., for a period of about 2 to about 6 days until a satisfactory concentration of statolon has been produced. Aeration is usually carried out at a rate between about 0.2 and about 2 volumes of air per volume of fermentation liquid per minute. The fermentation is then discontinued, and the mycelia are separated by conventional means, such as by filtration, centrifugation, screening, or the like. The broth obtained thereby can be used as a prophylactic agent against viruses without further treatment, but should preferably be subjected to purification and/or concentration before use.

Concentration and purification of statolon can be accomplished by a variety of means, starting with filtered statolon-containing broth produced by any of the statolon-producing strains of *Penicillium stoloniferum*.

It has been found, for example, that from 25 to 40 percent of the antiviral activity can be sedimented by centrifuging the filtered broth for four hours at 55,000 g.

In another technique, the statolon values are precipitated by acidifying the filtered broth to a pH between about 4 and about 6.5, preferably with glacial acetic acid or other weak organic acid, and diluting with an organic antisolvent for statolon to an antisolvent concentration around 10 to 50 percent by volume or somewhat higher. Suitable antisolvents for this purpose are the water-miscible oxygen-containing organic liquids, such as methanol, ethanol, isopropyl alcohol, n-propyl alcohol, acetone, dioxane, tetrahydrofurfuryl alcohol, dimethylformamide, dimethyl sulfoxide, and the like. When precipitated in this way, the statolon values tend to undergo a reaction of unascertained nature which converts the material gradually into a practically insoluble solid; if, therefore, a soluble product is desired, the precipitate should be separated promptly when the precipitation has reached substantial completion, and should then be redissolved promptly in dilute aqueous alkaline bicarbonate solution having a pH above about 8, suitably aqueous 2 percent sodium bicarbonate solution having a pH level around 8.6. For storage and/or use, the resulting solution is conveniently adjusted to around pH 7 by treatment with carbon dioxide.

If an insoluble product is desired, the following will exemplify a convenient procedure. The filtered broth is cooled to just above the freezing point, adjusted to pH 5–6 by gradual addition of glacial acetic acid, diluted with cold (−40° C.) isopropyl alcohol to around 33 percent concentration of the alcohol by volume, and allowed to stand around 12 hours at about −15° C., during which time the statolon values are precipitated substantially completely in the form of an insoluble solid. The precipitate is readily recovered by centrifuging and washing with cold aqueous 33 percent isopropyl alcohol. The product is prepared for use by suspending in an aqueous medium adjusted in pH to about 7.5, suitably aqueous M/15 phosphate buffer, aqueous 2 percent sodium bicarbonate solution, or aqueous 0.01 M sodium acetate solution.

In a modification of the foregoing method, the filtered broth is warmed to around 35 to 50° C., acidified to around pH 4–5, cooled to just above the freezing point, diluted with cold methanol or other antisolvent for statolon, and allowed to stand in the cold. The statolon values are precipitated in good yield as a practically insoluble solid in a period of about four hours.

Further purification of the insoluble precipitate can be carried out by appropriate modification of the methods employed for the isolation of DNA by Kay et al., J. Am. Chem. Soc., 74 (1952), 1724, and Chargaff et al., J. Biol. Chem., 177 (1949), 405. The precipitate is resuspended in 10 times its volume of aqueous 0.15 M NaCl. One-tenth volume of 5 percent sodium dodecyl sulfate in aqueous 40 percent ethanol solution is added, and the mixture is stirred for three hours at room temperature. Solid NaCl is then added with stirring to bring the NaCl concentration to 1 molar. During this procedure, a complex of sodium dodecyl sulfate and protein is precipitated, and the precipitate is subsequently removed by centrifuging at 3000 g for one hour. To the supernatant is added one volume of cold ethanol. The resulting precipitate is removed by centrifugation in the cold, washed with cold aqueous 50 percent ethanol, and dissolved in water by shaking for around 10 hours. Undissolved material is removed by centrifugation and discarded. To the liquid phase is added lanthanum chloride to a final concentration of 0.5 percent by weight. The resulting precipitate is separated by centrifugation and is reconstituted by shaking in the cold for around 48 hours in a minimal amount of an aqueous solution of 1 M potassium chloride and 0.25 M potassium oxalate. The precipitate of lanthanum oxalate formed thereby is separated and withdrawn. The aqueous solution is dialyzed for 48 hours against cold aqueous 0.05 M KCl-0.05 M glycine, pH 8.1. The resulting product is a solution of statolon having a greatly reduced proportion of protein. It can be used as such, or can be preserved by freeze-drying, after which it can be reconstituted by shaking with aqueous 2 percent sodium bicarbonate solution.

A preferred method of separation and purification, yielding a product of superior solubility, employs precipitation under mildly acidic conditions in the presence of a dissolved magnesium salt and an organic antisolvent for statolon, optionally in the presence of a diatomaceous earth filter aid or other inert, finely divided, water-insoluble solid. The filtered broth is first adjusted to a pH around 4 to 6, preferably about 5, and to it is added a water-soluble magnesium salt such as magnesium sulfate, magnesium acetate, magnesium nitrate, or preferably magnesium chloride, to a concentration between about 0.001 and about 0.1 M, preferably around 0.01 M, followed by a water-miscible oxygen-containing organic liquid such as acetone or the like, as disclosed above, to a concentration between about 15 and about 40 percent by volume of the resulting liquid mixture, preferably about 20 percent by volume. The mixture is then adjusted as desired to a pH between about 3 and about 6, preferably 4, and to it is added Hyflo Super-Cel filter aid or the like in a proportion between about 0.5 and about 2 percent by weight or more, preferably about 1 percent by weight, after which the mixture is agitated for around 20 minutes. During this period, the statolon deposits upon the particles of the added solid and is thereby withdrawn substantially completely from the liquid. Whether this result is achieved through the mechanism of adsorption has not been fully established, but in any event the added solid particles serve as centers for the deposition and withdrawal of the statolon values from the fermentation liquor. The resulting slurry is filtered promptly, generally within less than about one hour, and preferably within less than about 30 minutes, before the statolon values become insolubilized to any substantial extent, and the filtration solids are washed thoroughly with a liquid of composition corresponding to the liquid phase in which the adsorption was carried out (e.g., 0.01 M magnesium chloride in aqueous 20 percent acetone).

Removal of the statolon values from the washed precipitate is carried out with a dilute aqueous solution of an alkali-metal bicarbonate at a pH above about 8, preferably around 8.5 to 9. Suitable bicarbonates include potassium and ammonium bicarbonates and the like, preferably sodium bicarbonate. The washed solid is suspended in aqueous bicarbonate solution containing between about 1 and about 5 percent by weight of the bicarbonate employed, the volume of the solution being suitably around 5 percent of the original broth volume, and the mixture is agitated for around 30 minutes, then filtered. The bicarbonate treatment is repeated one or more times, and the wash liquids are combined to give a slightly opalescent solution having a volume generally around 10 percent of that of the original broth.

Further removal of toxic factors and inert impurities from the statolon solution can be accomplished by washing one or more times with a water-immiscible lower-aliphatic alcohol in the range of $C_4$ to about $C_8$, such as n-butanol, sec.-butanol, tert.-butanol, n-amyl alcohol, isoamyl alcohol, n-hexyl alcohol, isohexyl alcohol, and the like, or with phenol, or with a mixture thereof, resulting in an aqueous solution which retains full antiviral activity without opalescense. A preferred solvent for this purpose is a mixture of phenol and n-butanol, optimally in a ratio of around 1:3 by volume. The solvent which becomes dissolved thereby in the aqueous statolon solution is removed by washing with ethyl ether, after which the small proportion of dissolved ether is stripped out under vacuum.

The product obtained by the quasi-adsorption method as described above is soluble in aqueous 2 percent sodium bicarbonate solution and has a specific antiviral activity between 100 and 200 times that of the original fermentation broth. In mouse tests, complete protection against viruses is obtained by injection of quantities as low as 10 to 25 µg. (0.8–2.0 mg./kg.) of nondialyzable solids per mouse. The yield of nondialyzable product is between 500 and 750 mg. per liter of the original ferementation broth.

Statolon forms insoluble complexes with copper, nickel, zinc, cobalt, cadmium, lead, and manganese compounds, and also with polymeric substances such as dextran, gelatin, glycogen, and modified cellulose. It appears to be firmly bound to such polymeric substances; for example, when adsorbed to diethylamino-ethylcellulose, it cannot be eluted with salt solution at a wide range of pH and concentration levels. It also tends to adhere to cell surfaces.

Statolon, in its uncomplexed form, is not inactivated by treatment with proteolytic enzymes, and for this reason the active principle is probably not protein-like in nature. This is further demonstrated by the behavior of statolon upon being washed with phenol, a procedure which removes proteins. For instance, a butanol-washed statolon solution obtained from a Hyflo Super-Cel precipitate as described above and containing 31 percent protein can be reduced in protein content to essentially zero by extraction with a mixture of phenol and n-butanol, but is only very slightly reduced in antiviral activity.

The available evidence indicates that statolon does not act directly upon the virus itself, but exerts its action upon the host cell. Moreover, it is effective only by pretreatment before exposure of the cell to the virus, and is thus prophylactic in its action rather than therapeutic. The low toxicity of statolon and its effectiveness in protecting cells make it a useful tool in studying host-virus and host-tumor relationships.

Statolon is prophylactically active against a wide range of viruses, including the viruses causing canine distemper, lymphomatosis in fowl, shipping fever in cattle, transmissible gastroenteritis in swine, and coryza and other upper respiratory illnesses, as well as against the ECHO viruses, the enteroviruses in monkeys, MM neurotropic virus, Semiliki Forest virus, and NEF 1 poliomyelitis virus. In addition, statolon has demonstrated antitumor activity against transplanted P-1534 leukemia, Crocker sarcoma, 180 ascites, and virus-induced Rous sarcoma.

Statolon can be prepared, stored, and used in a variety of pharmaceutical forms. An aqueous solution of the active material can be sterilized by storage under ether at 3° C. and pH 8.6 for a short time, after which the ether layer can be separated, the dissolved ether stripped out, the pH adjusted to around 7 with sterile acid, and the sterile solution filled into suitable vials or ampoules. Statolon is preferably preserved by freeze-drying in vials or ampoules, in combination with a stabilizer such as glucose, mannitol, sorbitol, glycine, or the like, in which condition it is stable indefinitely. A preferred composition for freeze-drying comprises an aqueous solution of about pH 7 containing 10 percent nondialyzable statolon solids, 40 to 50 percent sodium bicarbonate, and 40 to 50 percent glucose.

Statolon can be administered by topical application to susceptible tissues, or, for systemic application, by intraperitoneal injection. Other forms of injection (e.g., intramuscular, subcutaneous) tend to produce tissue damage, and are not indicated. The liquid concentrate is conveniently sprayed or nebulized into the throat or nasal cavity to inhibit viral infections. The dried material is conveniently made up into a solution with sterile water to a statolon concentration between about 100 and about 200 times the concentration in the fermetation broth, and is similarly applied. The solution is nontoxic, and is essentially free from side effects or other hazards when used as directed. Inasmuch as the effect of the material is prophylactic in nature, the medicament should be applied well in advance of anticipated exposure, preferably at least about 12 to 24 hours in advance.

An illustration of the antiviral activity of statolon is given by the data in the following table. The data are from tests on 12-gram Swiss mice infected with MM neurotropic virus. Groups of 10 mice were injected subcutaneously with approximately 100 $LD_{50}$ doses of the virus per mouse in 0.5 ml. of solution. After such an injection, control mice which received no antiviral substance succumbed in an average of 4.5 to 5.2 days. The test mice received 0.5 ml. of the designated statolon preparation, injected intraperitoneally 18 hours prior to virus challenge. The test was concluded at the end of 12 days. The results are scored in terms of mean survival days for each group.

| Statolon Preparation | Dose, mg./kg. | Mean Survival, days |
|---|---|---|
| Filtered broth | 357–406 | 11.0–12.0 |
| Hyflo-purified | 2.4–7.8 | 10.7–12.0 |
| Hyflo, BuOH-washed | 1.1–3.5 | 11.2–12.0 |
| Hyflo, Phenol-ChCl₃ washed | 1.3–2.5 | 10.8–11.7 |
| Isopropyl alc. ppt | 10.5–42.9 | 11.7–12.0 |
| Dextran complex | Not determined | 10.8–11.7 |

The invention will be more fully understood from the following operating example, which is submitted solely for the purpose of illustrating the invention and not as a limitation upon the scope thereof.

*Example*

A medium having the following composition, expressed in grams per liter, is prepared and introduced into shake flasks:

| | |
|---|---|
| Glycerol | 5 |
| Glucose | 5 |
| Tryptone | 2.5 |
| Peptone | 2.5 |
| Yeast extract | 1 |
| Soybean meal | 3 |
| Corn steep liquor solids | 3.24 |
| NaCl | 5 |
| $K_2HPO_4$ | 1 |

The flasks are sterilized for 30 minutes at 120° C. and 15–17 p.s.i. steam pressure. They are then innoculated from peptone agar slants of *Penicillium stoloniferum* var. ATCC 14586 and are shaken and incubated at 26° C. for 48 hours.

The inoculum thus obtained, measuring approximately 3 liters, is transferred to a 45-liter fermenter containing 30 liters of sterile nutrient medium of the same composition, with penicillin G added to a concentration of about 50 units/ml., and the mixture is fermented at 25–30° C. with an aeration rate of about one cubic foot of air per cubic foot of medium per minute. Agitation is at the rate of about 600 r.p.m. with an agitator of the flat-blade turbine type having six blades. An antifoam agent of conventional type is added as necessary. During the fermentation, the pH drops from an initial level of about 6.5–6.7 to about 5.5–5.8 in 18–24 hours, then rises slowly and levels out at about 8.4–8.7 at 96–120 hours. Meanwhile, the mycelial content rises sharply to a maximum of about 22 weight-percent at 65 hours, then falls off to a level of about 8 percent at 120 hours. The mycelial content is conveniently determined by centrifuging a sample of the fermentation liquor at 3000 g for 30 minutes and measuring the packed mycelia thus obtained. The antiviral activity of the fermentation broth is at first negligible, and begins to apear only after the mycelial content reaches its maximum and begins to decrease. This inverse relationship of antiviral activity to mycelial content continues until the peak of activity is reached at about 120 hours, at which point the fermentation is terminated. The mycelia are separated from the fermentation mixture by filtration. The filtered broth, measuring 25 liters in volume, is adjusted to pH 5.0 with 1 N hydrochloric acid. To the broth is then added 50.7 g. of magnesium chloride hexahydrate to a final concentration to 0.01 M, followed by 6.25 liters of acetone (20 volume-percent final concentration). The mixture is adjusted to pH 4.0 with 1 N hydrochloric acid. To it is then added 156 g of Hyflo Super-Cel filter aid (0.5 percent w./v.), and the mixture is agitated for a period of 20 minutes. The solids are filtered off, and the liquid is discarded. The filter cake is washed by slurrying with 1.25 liters (5 percent of the original broth volume) of a 0.01 M solution of magnesium chloride hexahydrate (2.03 g. per liter) in aqueous 20 percent acetone. The slurry is agitated for five minutes and filtered, and the washing procedure is repeated. The washed cake, containing the statolon values, is subjected to elution by admixture with 1.25 liters of aqueous 2 percent sodium bicarbonate solution and agitation for 30 minutes, after which the solids are filtered off. This elution procedure is repeated, and the two aqueous sodium bicarbonate eluates are combined, yielding a volume of 2.5 liters, equivalent to 10 percent of the original broth volume. The combined eluates, which are slightly opalescent, are combined with 830 ml. of n-butanol (one-third the eluate volume), vigorously agitated, and stratified by centrifuging at 2000 r.p.m. for 30 minutes. The n-butanol phase and accompanying interphase are separated and discarded. The residual aqueous phase is treated once more with n-butanol. The washed aqueous phase is then extracted with two 500-ml. portions of ethyl ether to remove residual n-butanol, after which dissolved ether is stripped off under vacuum. The aqueous solution obtained thereby contains 2.0 g. of nondialyzable solids analyzing 4.8 percent nitrogen, 0.88 percent phosphorus, 8.4 percent hexosamine, 30 percent carbohydrate, and 21.6 percent protein.

The n-butanol-washed aqueous solution is further purified and concentrated by the following procedure. A 2.5-liter portion of the n-butanol-washed aqueous solution (pH 8.7) is mixed and agitated with 2.5 liters of cold acetone (3° C.). A light flocculent precipitate forms and is allowed to settle overnight. The light-yellow supernatant liquid is decanted sufficiently to permit recovery of the precipitate by centrifugation. The recovered precipitate is washed with 500 ml. of 1:1 acetone-water (3° C.) and again recovered by centrifugation. The solid material is suspended in 200 ml. of aqueous 2 percent sodium bicarbonate solution and agitated for two hours at 3° C. to form a stable opalescent solution. The entrained acetone is stripped off under vacuum, and the volume is adjusted to 250 ml. with additional aqueous 2 percent sodium bicarbonate solution. The resulting product solution contains 1 g. of nondialyzable solids, equal to approximately 0.3 percent of the total original broth solids, and contains statolon at a concentration 100 times that of the original broth.

We claim:

1. An improved method for preparing an antiviral substance, which method comprises subjecting a nutrient medium containing carbohydrate, a nitrogen source, and mineral salts to tank fermentation by a microorganism of the strain *Penicillium stoloniferum* ATCC 14586 with aeration and agitation for a time sufficient to elaborate an antiviral substance, and recovering said antiviral substance from the fermentation broth.

2. An improved method for preparing an antiviral substance, which method comprises inoculating a nutrient medium containing a carbohydrate, a nitrogen source, and mineral salts with a microorganism of the strain *Penicillium stoloniferum* ATCC 14586, incubating the inoculated medium in a tank fermenter with agitation and aeration at growth temperature for said microorganism until an antiviral substance has been produced at substantial concentration in the fermentation broth, and recovering said antiviral substance therefrom.

3. An improved method for preparing an antiviral substance, which method comprises inoculating a nutrient medium containing a carbohydrate, a nitrogen source, and mineral salts with a microorganism of the strain *Penicillium stoloniferum* ATCC 14586, incubating the inoculated medium in a tank fermenter with agitation and aeration at a temperature between about 20 and about 35° C. until maximum mycelial growth has taken place and until an antiviral substance has been produced at substantial concentration in the fermentation broth, and recovering said anitviral substance therefrom.

4. An improved method for preparing an antiviral substance, which method comprises inoculating a nutrient medium containing a carbohydrate, a nitrogen source, and mineral salts with a microorganism of the strain *Penicillium stoloniferum* ATCC 14586, agitating and incubating the inoculated medium in a tank fermenter at a temperature between about 20 and about 35° C. and with aeration at a rate between about 0.2 and about 2 volumes of air per volume of medium per minute until maximum mycelial growth has taken place and until an antiviral substance has been produced at substantial concentration in the fermentation broth, and recovering said antiviral substance therefrom.

5. An improved method for preparing an antiviral substance, which method comprises subjecting a nutrient medium containing a carbohydrate, a nitrogen source, and mineral salts to fermentation by a statolon-producing strain of *Penicillium stoloniferum* effective in submerged culture fermentation for a time sufficient to elaborate a substantial proportion of statolon therein, separating the mycelia from the fermentation broth, acidifying the broth to a pH between about 4 and about 6.5, whereby the statolon values are precipitated, and separating the precipitate from the resulting slurry.

6. In a method for preparing an antiviral substance, which method comprises subjecting a nutrient medium containing a carbohydrate, a nitrogen source, and mineral salts to aerated submerged fermentation by a microorganism of the strain *Penicillium stoloniferum* ATCC 14586 for a time sufficient to elaborate a substantial proportion of statolon therein, separating the mycelia from the fermentation broth, and recovering the statolon from said fermentation broth, the improved method for recovery which comprises acidifying said fermentation broth to a pH between about 4 and about 6.5, whereby the statolon values are precipitated, separating the precipitate from the resulting slurry, suspending the precipitate in aqueous sodium chloride solution, precipitating protein therefrom with sodium dodecyl sulfate, separating the protein-containing precipitate, precipitating the statolon values from the supernatant liquid by adding ethanol thereto, separating the precipitate, dissolving said precipitate in water, precipitating the statolon values with lanthanum chloride, separating the precipitate, agitating the precipitate with aqueous potassium chloride and potassium oxalate, separating the resulting precipitate of lanthanum oxalate, and dialyzing the resulting solution against aqueous potassium chloride and glycine, whereby a solution of statolon is obtained having a greatly reduced proportion of protein.

7. In a method for preparing an antiviral substance, which method comprises subjecting a nutrient medium containing a carbohydrate, a nitrogen source, and mineral salts to fermentation by a statolon-producing strain of *Penicillium stoloniferum* effective in submerged culture fermentation for a time sufficient to elaborate a substantial proportion of statolon therein, separating the mycelia from the fermentation broth, and recovering the statolon values from the filtered broth, the improvement which comprises acidifying the filtered broth to a pH between about 4 and about 6.5, whereby the statolon values are precipitated, separating the precipitate from the resulting slurry before substantial conversion thereof into alkali-insoluble form, and dissolving said precipitate in an aqueous solution of alkali-metal bicarbonate.

8. In a method for preparing an antiviral substance, which method comprises subjecting a nutrient medium containing a carbohydrate, a nitrogen source, and mineral salts to fermentation by a statolon-producing strain of *Penicillium stoloniferum* effective in submerged culture fermentation for a time sufficient to elaborate a substantial proportion of statolon therein, separating the mycelia from the fermentation broth, and recovering the statolon values from the filtered broth, the improvement which comprises diluting the filtered broth with a water-miscible oxygen-containing organic liquid to a concentration of said liquid between about 10 and about 50 percent by volume and acidifying to a pH between about 4 and about 6.5, whereby the statolon values are precipitated, separating the precipitate from the resulting slurry before substantial conversion thereof into alkali-insoluble form, and dissolving said precipitate in an aqueous solution of alkali-metal bicarbonate.

9. In a method for preparing an antiviral substance, which method comprises subjecting a nutrient medium containing a carbohydrate, a nitrogen source, and mineral salts to fermentation by a statolon-producing strain of *Penicillium stoloniferum* effective in submerged culture fermentation for a time sufficient to elaborate a substantial proportion of statolon therein, separating the mycelia from the fermentation broth, and recovering the statolon values from the filtered broth, the improvement which comprises adding to the filtered broth an inert, finely divided, water-insoluble solid and a water-miscible oxygen-containing organic liquid to a concentration between about 10 and about 50 percent by volume, acidifying the mixture to a pH between about 4 and about 6.5, whereby the statolon values are precipitated around the particles of said solid, separating the statolon-containing solid from the resulting slurry before substantial conversion of the statolon into alkali-insoluble form, and dissolving the statolon therefrom with an aqueous solution of alkali-metal bicarbonate at a pH above about 8.

10. In a method for preparing an antiviral substance, which method comprises subjecting a nutrient medium containing a carbohydrate, a nitrogen source, and mineral salts to fermentation by a statolon-producing strain of *Penicillium stoloniferum* effective in suberged culture fermentation for a time sufficient to elaborate a substantial proportion of statolon therein, separating the mycelia from the fermentation broth, and recovering the statolon values from the filtered broth, the improvement which comprises dissolving in the filtered broth a magnesium salt to a concentration between about 0.001 M and about 0.1 M, and a water-miscible oxygen-containing organic liquid to a concentration between about 10 and about 50 percent by volume, subjecting the mixture to contact with an inert, finely divided, water-insoluble solid at a pH between about 4 and about 6.5, whereby the statolon values are precipitated around the particles of said solid, separating the solid from the resulting slurry before substantial conversion of the statolon into alkali-insoluble form, and washing the statolon from said solid with an aqueous solution of sodium bicarbonate at a pH above about 8.

11. In a method for preparing an antiviral substance, which method comprises subjecting a nutrient medium containing a carbohydrate, a nitrogen source, and mineral salts to fermentation by a statolon-producing strain of *Penicillium stoloniferum* effective in submerged culture fermentation for a time sufficient to elaborate a substantial proportion of statolon therein, separating the mycelia from the fermentation broth, and recovering the statolon values from the filtered broth, the improvement which comprises subjecting the filtered broth to contact with diatomaceous earth at a pH around 5 in the presence of magnesium chloride at a concentration around 0.01 M and acetone at a concentration around 20 volume-percent, whereby the statolon values are precipitated around the particles of said diatomaceous earth, separating the solid from the resulting slurry before substantial conversion of the statolon into alkali-insoluble form, washing the statolon from said solid with an aqueous solution of a mild alkali at a pH above about 8, and washing impurities from the resulting solution with a solvent selected from the group consisting of the water-immiscible lower-aliphatic alcohols, phenol, and mixtures thereof.

References Cited in the file of this patent

Powell et al.: Antibiotics Annual, 1953–1954, pp. 147–155. (Copy in Division 63.)